United States Patent
Paek

(10) Patent No.: US 7,155,985 B2
(45) Date of Patent: Jan. 2, 2007

(54) TORQUE SENSOR FOR VEHICLE STEERING SYSTEM

(75) Inventor: Seung-Ho Paek, Uijeongbu-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/045,332

(22) Filed: Jan. 31, 2005

(65) Prior Publication Data

US 2006/0107764 A1    May 25, 2006

(30) Foreign Application Priority Data

Nov. 16, 2004    (KR) .................... 10-2004-0093467

(51) Int. Cl.
*G01L 3/14* (2006.01)
(52) U.S. Cl. .................... 73/862.193; 73/862.338; 73/862.339; 73/862.325; 73/862.326; 73/862.331
(58) Field of Classification Search .......... 73/862.193, 73/862.326, 862.325, 862.321, 862.191
See application file for complete search history.

(56) References Cited

U.S. PATENT DOCUMENTS

| | | | | |
|---|---|---|---|---|
| 5,920,174 A * | 7/1999 | Kawada et al. | ............. | 318/663 |
| 5,982,137 A * | 11/1999 | Endo | ............. | 318/812 |
| 6,502,024 B1 * | 12/2002 | Ishihara et al. | ............. | 701/41 |
| 6,581,478 B1 * | 6/2003 | Pahl et al. | ............. | 73/862.326 |
| 6,622,576 B1 * | 9/2003 | Nakano et al. | ......... | 73/862.331 |
| 6,704,665 B1 * | 3/2004 | Ueno | ............. | 702/41 |
| 6,727,669 B1 * | 4/2004 | Suzuki et al. | ............. | 318/139 |
| 6,807,871 B1 * | 10/2004 | Paek | ............. | 73/862.339 |
| 6,882,913 B1 * | 4/2005 | Bullister et al. | ............. | 701/41 |
| 2003/0040872 A1 * | 2/2003 | Ueno | ............. | 702/41 |
| 2006/0123926 A1 * | 6/2006 | Paek | ............. | 73/862.326 |

FOREIGN PATENT DOCUMENTS

JP    8068703    3/1996

OTHER PUBLICATIONS

English Language Abstract of JP 8068703.
U.S. Appl. No. 11/045,369 to Seung-Ho Paek, filed Jan. 31, 2005.
U.S. Appl. No. 11/045,338 to Seung-Ho Paek, filed Jan. 31, 2005.

* cited by examiner

*Primary Examiner*—Michael Cygan
*Assistant Examiner*—Freddie Kirkland, III
(74) *Attorney, Agent, or Firm*—Greenblum & Bernstein, P.L.C.

(57) ABSTRACT

A torque sensor for a vehicle steering system includes a voltage boosting circuit that boosts a voltage supplied from a power source, an oscillator, a current amplifier, an inverting current amplifier, first and second coils, first and second resistors, a differential amplifier, a sampling pulse generator that generates a sampling pulse, a synchronous wave detector that detects the AC voltage output from the first differential amplifier, a first sample-and-hold circuit section that samples and holds the voltage output from the first synchronous wave detector, and a voltage-current converter that converts the voltage output from the first sample-and-hold circuit section into current and outputs the current as a torque signal $T_s$, thereby stably supplying power to the torque sensor for a steering system.

5 Claims, 4 Drawing Sheets

TORQUE SENSOR FOR VEHICLE STEERING SYSTEM

CROSS-REFERENCE TO RELATED APPLICATIONS

This application claims priority of Korean Application No. 10-2004-0093467, filed on Nov. 16, 2004, the disclosure of which is incorporated fully herein by reference.

FIELD OF THE INVENTION

The present invention relates to a torque sensor for a vehicle steering system, and more particularly to a torque sensor for a vehicle steering system which can stably supply power to the torque sensor even when a battery voltage is lowered due to a temporary overload of the vehicle.

BACKGROUND OF THE INVENTION

In general, in an electronic control unit (ECU) of an electrical power steering (hereinafter, referred to as EPS) system of a vehicle, a steering torque resulting from manipulation of a steering wheel by a driver is detected by a torque sensor so as to accomplish the steering operation.

In supplying power to the torque sensor for detecting the steering torque in the conventional EPS system, a battery voltage is supplied to the ECU, the input voltage passes through a regulator in the ECU, and the voltage output from the regulator is used as a source voltage of the torque sensor.

However, when the battery voltage drops lower than a predetermined voltage due to a temporary overload of the vehicle, the source voltage of the torque sensor output from the regulator in the ECU is lower than an allowable range of a rated voltage and thus the torque sensor does not normally work, so that there occurs a problem that the steering operation is not accurately accomplished due to decrease in output of the torque sensor.

SUMMARY OF THE INVENTION

The present invention provides a torque sensor for a vehicle steering system, which comprises a voltage boosting circuit section for boosting a voltage supplied from a power source and uses the boosted voltage as a driving power source of the torque sensor, so as to stably supply power to the torque sensor even when a battery voltage is lowered due to a temporary load of the vehicle.

According to an aspect of the present invention, a torque sensor for a vehicle steering system include a voltage boosting circuit section that boosts a voltage supplied from a power source; an oscillator that oscillates with the boosted voltage from the voltage boosting circuit section; a current amplifier that outputs a DC voltage and an AC voltage having a phase equal to that of the output voltage of the oscillator;an inverting current amplifier that outputs a DC voltage and an AC voltage having a phase opposite to that of the output voltage of the oscillator; first and second coils, each of which is connected to an output terminal of the current amplifier and an output terminal of the inverting current amplifier, respectively, the first and second coils connected in series to each other; first and second resistors that are connected in parallel to the first and second coils, the first and second resistors connected in series to each other; a first differential amplifier that is supplied with the voltage of a node between the first and second coils and the voltage of a node between the first and second resistors, the first differential amplifier differentially amplifying the supplied voltages; a first sampling pulse generator that generates a sampling pulse synchronized with the output voltage of the oscillator; a first synchronous wave detector that detects the AC voltage output from the first differential amplifier in synchronism with the sampling pulse output from the first sampling pulse generator; a first sample-and-hold circuit section that samples and holds the voltage output from the first synchronous wave detector; and a first voltage-current converter that converts the voltage output from the first sample-and-hold circuit section into current and outputs the current as a torque signal Ts.

The torque sensor for a vehicle steering system according to the present invention may further include third and fourth resistors that are connected in parallel to the first and second coils, the third and fourth resistors connected in series to each other; a second differential amplifier that is supplied with the voltage of the node between the first and second coils and the voltage of a node between the third and fourth resistors, the second differential amplifier differentially amplifying the supplied voltages; a second sampling pulse generator that generates a sampling pulse synchronized with the output voltage of the oscillator; a second synchronous wave detector that detects the AC voltage output from the second differential amplifier in synchronism with the sampling pulse output from the second sampling pulse generator; a second sample-and-hold circuit section that samples and holds the voltage output from the second synchronous wave detector; and a second voltage-current converter that converts the voltage output from the second sample-and-hold circuit section into current and outputs the current as a fail-safe torque signal Ts'.

BRIEF DESCRIPTION OF THE DRAWINGS

The above and other features and advantages of the present invention will become more apparent by describing in detail exemplary embodiments thereof with reference to the attached drawings in which:

FIG. 4B is a waveform diagram illustrating an output voltage of a node between first and second resistors oscillator according to the present invention;

DETAILED DESCRIPTION OF THE PREFERRED EMBODIMENTS

Hereinafter, preferred embodiments of the present invention will be described in detail with reference to the accompanying drawings.

A structure of a torque sensor for a vehicle steering system according to the present embodiment will be described with reference to FIG. 1.

Figure 1:
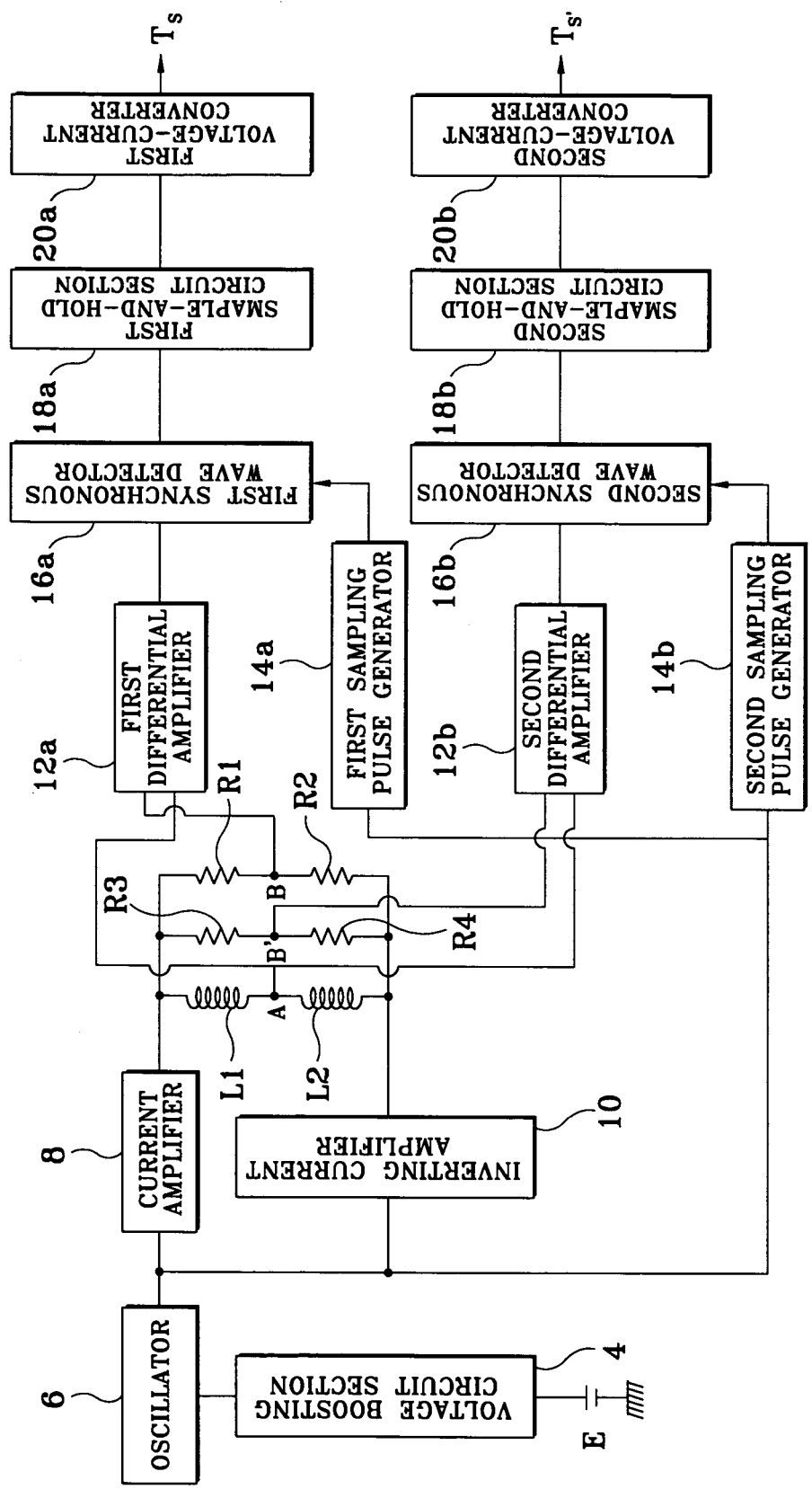
FIG. 1 is a block diagram illustrating a torque sensor for a steering system according to the present invention.

As shown in FIG. 1, in the present embodiment, a voltage boosting circuit section 4 boosting a voltage supplied from a power source E is provided so as to stably supply power to the torque sensor for a vehicle steering (EPS) system. Any booster circuit may be employed only if the voltage boosting circuit section 4 can boosting the supplied voltage two or more times.

That is, the torque sensor according to the present embodiment comprises: a voltage boosting circuit section 4 that boosts a voltage supplied from a power source E; an oscillator 6 that is supplied with the boosted voltage from the voltage boosting circuit section 4 and that oscillates; a current amplifier 8 that outputs an offset voltage $V_{offset}$ (DC voltage) and an AC voltage having a phase equal to that of the output voltage of the oscillator 6; an inverting current amplifier 10 that outputs an offset voltage $V_{offset}$ (DC voltage) and an AC voltage having a phase obtained by delaying the output voltage of the oscillator 6 and inverting the phase thereof by 180°; first and second coils L1 and L2 whose both ends are connected to the output terminals of the current amplifier 8 and the inverting current amplifier 10, respectively, and that are connected in series to each other; first and second resistors R1 and R2 that are connected in parallel to the first and second coils L1 and L2 and that are connected in series to each other; a first differential amplifier 12a that is supplied with the voltage of a node A between the first and second coils L1 and L2 and the voltage of a node B between the first and second resistors R1 and R2 and that differentially amplifies the supplied voltages; a first sampling pulse generator 14a that generates a sampling pulse synchronized with the output voltage of the oscillator 6; a first synchronous wave detector 16a that detects the AC voltage output from the first differential amplifier 12a in synchronism with the sampling pulse output from the first sampling pulse generator 14a; a first sample-and-hold circuit section 18a that samples and holds the voltage output from the first synchronous wave detector 16a; and a first voltage-current converter 20a that converts the voltage output from the first sample-and-hold circuit section 18a into current and that outputs the current as a torque signal Ts.

On the other hand, the torque sensor according to the present embodiment has a torque detecting structure for fail safe.

That is, the torque sensor further comprises: third and fourth resistors R3 and R4 that are connected in parallel to the first and second coils L1 and L2 and that are connected in series to each other; a second differential amplifier 12b that is supplied with the voltage of the node A between the first and second coils and the voltage of a node B' between the third and fourth resistors and that differentially amplifies the supplied voltages; a second sampling pulse generator 14b that generates a sampling pulse synchronized with the output voltage of the oscillator 6; a second synchronous wave detector 16b that detects the AC voltage output from the second differential amplifier 12b in synchronism with the sampling pulse output from the second sampling pulse generator 14b; a second sample-and-hold circuit section 18b that samples and holds the voltage output from the second synchronous wave detector 16b; and a second voltage-current converter 20b that converts the voltage output from the second sample-and-hold circuit section 18b into current and that outputs the current as a fail-safe torque signal Ts'. Such a torque detecting structure for fail safe is required to accomplish the steering operation using the torque detection signal Ts' for an auxiliary circuit, when troubles take place in the torque sensor such as when the torque detection signal Ts for a main circuit is reduced, etc.

In the structure according to the present embodiment described above, an offset voltage $V_{offset}$ corresponding to a boosting multiple of the voltage boosting circuit 4 is supplied to the oscillator 6, the current amplifier 8, the inverting current amplifier 10, the first and second differential amplifiers 12a and 12b, etc.

That is, in the present embodiment, since the boosted voltage is used as a driving power source of the torque sensor, the offset voltage, which is a DC voltage used for the oscillator, the current amplifier, the inverting current amplifier, the first and second differential amplifiers, etc., must be changed to correspond to the boosting multiple.

For example, the offset voltage of 3.5V was used with an operation voltage of 8V for a conventional torque sensor. When the operation voltage is 16V in the voltage boosting circuit structure according to the present embodiment, the offset voltage must be set such that the DC voltage is 6V or more. Incidentally, the offset voltage $V_{offset}$ is generated from a DC power source E applied through an offset voltage circuit structure.

Now, the operation of the torque sensor according to the present embodiment will be described with reference to the drawings.

As shown in FIG. 1, when power is supplied from the power source E, the supplied power is input to the voltage boosting circuit section 4 and the input voltage is boosted. That is, when the input voltage is 8V, the input voltage is boosted to 16V or 24V by the voltage boosting circuit section 4, and then the boosted voltage is used as the operation voltage for the torque sensor.

Figure 2:
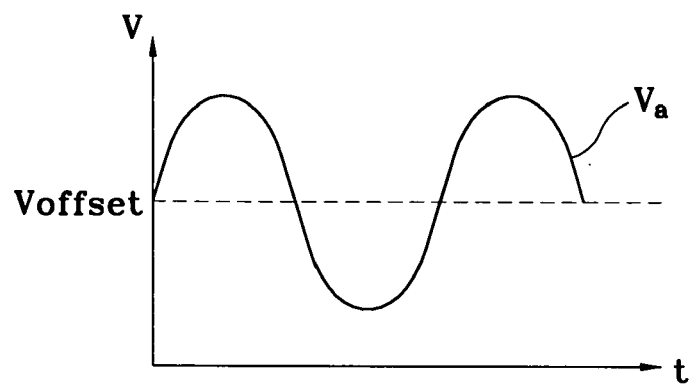
FIG. 2 is a waveform diagram illustrating an output voltage of an oscillator according to the present invention.

In this way, when the boosted voltage is supplied to the oscillator 6, the oscillator 6 oscillates. That is, as shown in FIG. 2, an oscillating voltage Va biased by the DC voltage $V_{offset}$ supplied to the oscillator 6 is output from the oscillator 6, and the output oscillating voltage Va is input to the current amplifier 8, the inverting current amplifier 10, and the first and second sampling pulse generators 14a and 14b.

Figure 3A:
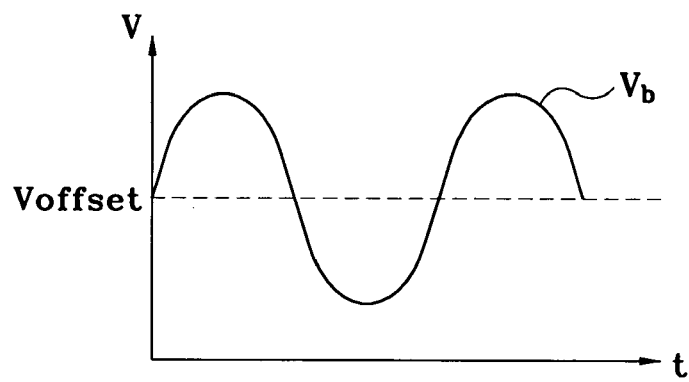
FIG. 3A is a waveform diagram illustrating an output voltage of a current amplifier according to the present invention.
Figure 3B:
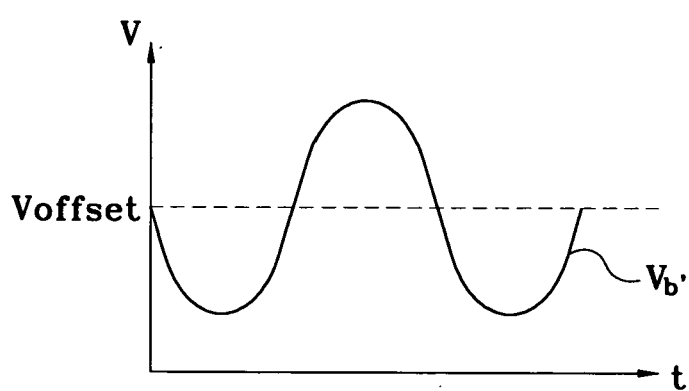
FIG. 3B is a waveform diagram illustrating an output voltage of an inverting current amplifier according to the present invention.

As shown in FIG. 3A, the current amplifier 8 outputs the DC voltage $V_{offset}$ and the AC voltage having a phase equal to that of the voltage output from the oscillator 6, and as shown in FIG. 3B, the inverting current amplifier 10 outputs the DC voltage $V_{offset}$ and the AC voltage Vb' obtained by delaying the phase of the voltage input from the oscillator 6 by 180°, at the same time.

Figure 4A:
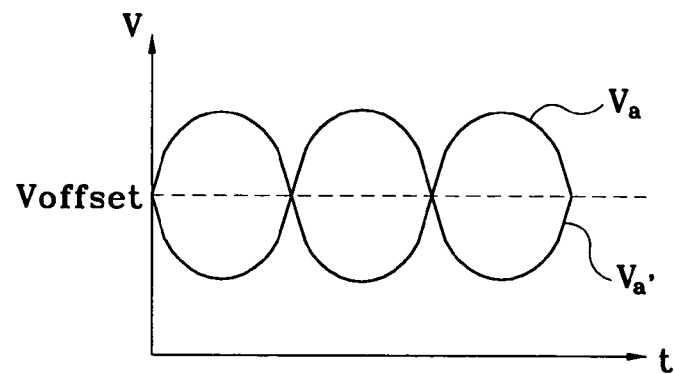
FIG. 4A is a waveform diagram illustrating an output voltage of a node between first and second coils according to the present invention.
Figure 4A:
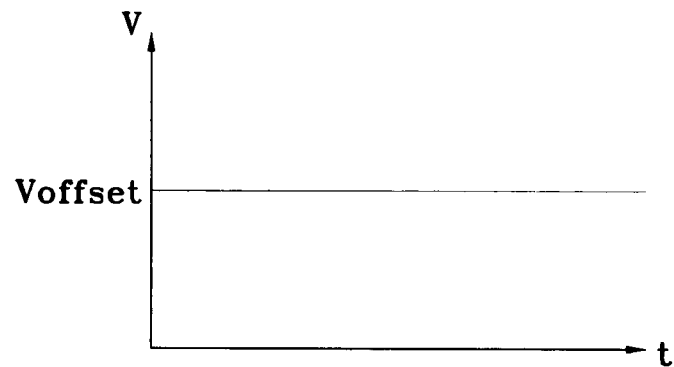

On the other hand, a temperature compensating coil L1 as the first coil and a torque detecting coil L2 as the second coil are connected between the output terminal of the current amplifier 8 and the output terminal of the inverting current amplifier 10. At this time, both ends of the temperature compensating coil L1 and the torque detecting coil L2 connected in series to each other are supplied with a difference voltage between the AC voltage Vb output from the current amplifier 8 and the AC voltage Vb' output from the inverting current amplifier 10. That is, since both ends of the temperature compensating coil L1 and the torque detecting coil L2 are supplied with only the DC voltage $V_{offset}$ having the same potential, DC current does not flow through the both ends. Therefore, as shown in FIG. 4A, when the impedance of the torque detecting coil L2 is greater than the impedance of the temperature compensating coil L1 (L2>L1), the AC voltage applied to the node A between the temperature compensating coil L1 as the first coil and the torque detecting coil L2 as the second coil is changed in the same way as the AC voltage Vb output from the current amplifier 8. On the contrary, when the impedance of the torque detecting coil L2 is smaller than the impedance of the temperature compensating coil L1 (L2<L1), the AC voltage applied to the node A is changed in the same way as the AC voltage Vb' output from the inverting amplifier 10.

The first and second resistors R1 and R2 connected in parallel to the temperature compensating coil L1 and the torque detecting coil L2 are connected in series to each other. When the first and second resistors R1 and R2 have the same resistance, as shown in FIG. 4B, only the DC voltage $V_{offset}$ is applied to the node B. Incidentally, when the third and fourth R3 and R4 for fail safe have the same resistance, the voltage of the node B' is equal to the voltage of the node B.

Figure 5:
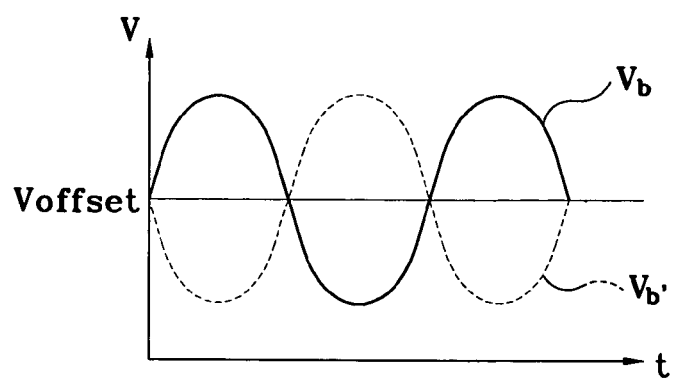
FIG. 5 is a waveform diagram illustrating output voltages of first and second differential amplifiers according to the present invention.

The voltages applied to the first differential amplifier 12*a* from the node between the first and second coils L1 and L2 and the node between the first and second resistors R1 and R2 are the DC voltage $V_{offset}$ of the node B between the first and second resistors and the AC voltage (Vb when L2>L1, and Vb' when L1>L2) of the node A between the first and second coils. The voltages are differentially amplified by the first differential amplifier 12*a* and then are output to the first synchronous wave detector 16*a*. The waveform of the voltage output from the first differential amplifier 12*a* is shown in FIG. 5.

Figure 6:
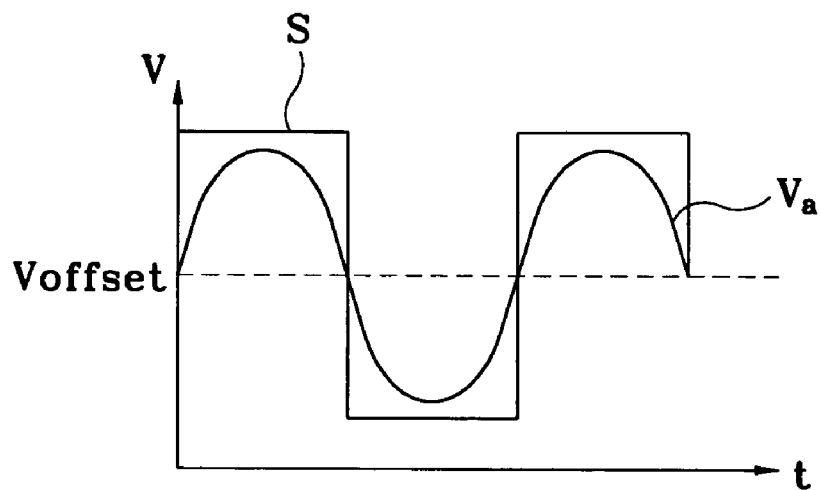
FIG. 6 is a waveform diagram illustrating output voltages of first and second sampling pulse generators according to the present invention.

On the other hand, the first sampling pulse generator 14*a* according to the present embodiment generates a sampling pulse s synchronized with the output voltage Va of the oscillator 6 (see FIG. 6). The generated sampling pulse signal is input to the first synchronous wave detector 16*a* along with the output voltage of the first differential amplifier 12*a*.

Figure 7:
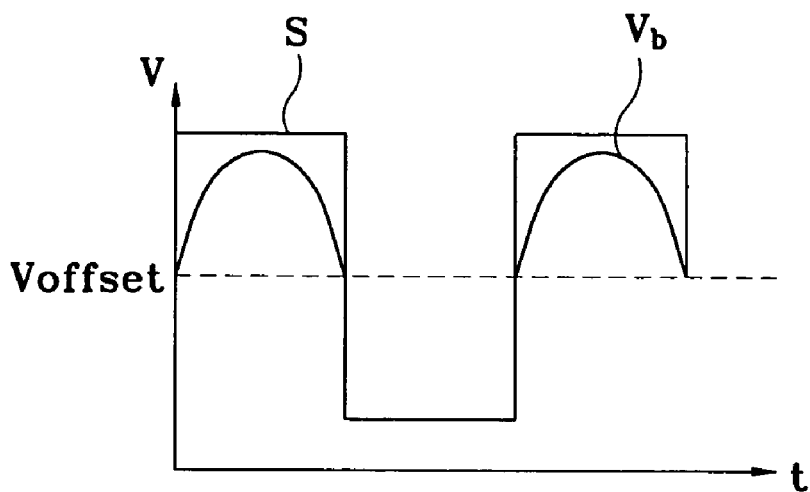
FIG. 7 is a waveform diagram illustrating output voltages of first and second synchronous wave detectors according to the present invention.

The first synchronous wave detector 16*a* receives the signals from the first differential amplifier 12*a* and the first sampling pulse generator 14*a* and detects the applied AC voltage in synchronism with the sampling pulse. For example, as shown in FIG. 7, when the sampling pulse has a "H" level, the first synchronous wave detector 16*a* detects the positive component of the output voltage Vb of the first differential amplifier 12*a* and the negative component of the output voltage Vb'. The detected waveform becomes a pulsating waveform as shown in FIG. 7. Incidentally, when the sampling pulse has a "H" level, it can be considered that the steering operation is performed such that the torque increases or decreases from a neutral position to the right side.

The voltage output from the first synchronous wave detector 16*a* is held by the first sample-and-hold circuit section 18*a* and is output as the torque detecting signal Ts through the first voltage-current converter 20*a*. The output torque detecting signal is input to an ECU controller (not shown), so that it is possible to secure a steering power by means of drive of a motor corresponding to the torque detecting signal Ts.

On the other hand, operation of the torque sensor for fail safe according to the present embodiment is the same as the operation of the torque sensor for a main circuit described above. That is, as described above, the torque detecting signal Ts' in the torque detecting structure for fail safe is used for detecting the fail-safe torque in the case where the torque detecting signal Ts for a main circuit is reduced, etc.

As described above, in the torque sensor according to the present invention, since the operating voltage of the torque sensor is boosted for use, it is possible to stably supply power to the torque sensor at any situation. In addition to, small variation in torque can be easily sensed by means of amplitude adjustment of the oscillator. Furthermore, since an amplification ratio of the differential amplifiers can be reduced smaller than the conventional one, it is possible to enhance the signal-to-noise (S/N) ratio.

Therefore, in the torque sensor for a vehicle steering system according to the present invention, it is possible to stably supply power to the torque sensor and to enhance the signal-to-noise (S/N) ratio, even when a battery voltage is lowered due to a temporary overload of the vehicle.

Although the preferred embodiments of the present invention have been described, the present invention is not limited to the preferred embodiments, but may be modified in various forms without departing from the scope of the appended claims. Therefore, it is natural that such modifications belong to the scope of the present invention.

What is claimed is:

1. A torque sensor for a vehicle steering system comprising:
    a voltage boosting circuit that boosts a voltage supplied from a power source;
    an oscillator that oscillates with the boosted voltage from the voltage boosting circuit;
    a current amplifier that outputs a DC voltage and an AC voltage having a phase equal to that of the output voltage of the oscillator;
    an inverting current amplifier that outputs a DC voltage and an AC voltage having a phase opposite to the phase of the output voltage of the oscillator;
    first and second coils, each of which is connected to one of
    an output terminal of the current amplifier and an output terminal of the inverting current amplifier, respectively, the first and second coils connected in series to each other;
    first and second resistors that are connected in parallel to the first and second coils, the first and second resistors connected in series to each other;
    a first differential amplifier that is supplied with the voltage of a node between the first and second coils and with the voltage of a node between the first and second resistors, the first differential amplifier differentially amplifying the supplied voltages;
    a first sampling pulse generator that generates a sampling pulse synchronized with the output voltage of the oscillator;
    a first synchronous wave detector that detects the AC voltage output from the first differential amplifier in synchronism with the sampling pulse output from the first sampling pulse generator;
    a first sample-and-hold circuit that samples and holds the voltage output from the first synchronous wave detector; and
    a first voltage-current converter that converts the voltage output from the first sample-and-hold circuit into current and outputs the current as a torque signal.

2. The torque sensor for a vehicle steering system as defined in claim 1, further comprising:
    third and fourth resistors that are connected in parallel to the first and second coils, the third and fourth resistors connected in series to each other;
    a second differential amplifier that is supplied with the voltage of the node between the first and second coils and with the voltage of a node between the third and fourth resistors, the first differential amplifier differentially amplifying the supplied voltages;

a second sampling pulse generator that generates a sampling pulse synchronized with the output voltage of the oscillator;

a second synchronous wave detector that detects the AC voltage output from the second differential amplifier in synchronism with the sampling pulse output from the second sampling pulse generator;

a second sample-and-hold circuit that samples and holds the voltage output from the second synchronous wave detector; and a second voltage-current converter that converts the voltage output from the second sample-and-hold circuit into current and outputs the current as a fail-safe torque signal.

3. The torque sensor for a vehicle steering system as defined in claim 1, wherein an offset voltage corresponding to a boosting multiple of the voltage input to the voltage boosting circuit is supplied to the oscillator.

4. The torque sensor for a vehicle steering system as defined in claim 2, wherein an offset voltage corresponding to a boosting multiple of the voltage input to the voltage boosting circuit is supplied to the oscillator.

5. A torque sensor according to claim 3, further comprising:

a temperature compensating coil that receives an output from the oscillator; and a torque detecting coil that receives an inverted output from the oscillator.

* * * * *